INVENTORS.
Willis J. Gray
BY
ATTORNEYS

June 25, 1957 W. J. GRAY 2,796,816
HARROW HITCH

Filed Nov. 22, 1954 2 Sheets-Sheet 2

INVENTORS
Willis J. Gray
BY
ATTORNEYS

United States Patent Office 2,796,816
Patented June 25, 1957

2,796,816

HARROW HITCH

Willis J. Gray, Johnstown, Colo.

Application November 22, 1954, Serial No. 470,227

7 Claims. (Cl. 97—5)

This invention relates to a harrow hitch and more particularly to a harrow hitch which automatically positions a harrow in correct alignment behind a two-way plow.

Two-way plows are used in farming to plow a field along a single side without the necessity of going around a periphery of the unplowed land. In using a two-way plow, the plow is worked along one side of a field in one direction, and at the end of the row the plow is turned around and the plowing is resumed back along freshly plowed row. Such plows provide means for turning the furrow in either direction to produce furrows in the same direction. One commonly used two-way plow is a tumble or throw plow in which two sets of plow shares are pivotally mounted 180° apart. Each plow share is set to throw its furrow in the direction opposite the other plow share. The plows are rotated to provide the correct furrow throw for the direction of operation. Another common type of plow is a lift plow, in which two opposite throw plows are mounted parallel whereby one plow may be in the ground while the other is raised, and on the reversing direction, the other plow may be moved into the ground and the one raised to provide a correct furrow turn for the two-way plowing.

Where the condition of the soil is favorable, simultaneous plowing and harrowing provides a definite advantage to a farmer in savings of time, labor, and equipment. With a tumble plow, or the like, the position of the plow shares and the resulting furrows, with respect to the center of the plow, changes. A centrally hitched harrow behind a two-way plow is not satisfactory as the harrow extends into the unplowed land. Means must, therefore, be provided to hitch a harrow into either side of a two-way plow so that the harrow will ride in the plowed land.

According to the present invention, there is provided an automatic harrow positioner, which permits the change of position of the harrow from one side to the other side of the plow when the plows are changed preparatory to reversing the direction of plowing. The device includes a simple, stationary bar and slidable ring hitch for connecting a harrow behind the plow. Means are provided for holding the hitch ring in one position and releasing it on tripping the plows to permit the hitch to move to a new position on the slide bar.

Included among the objects and advantages of the present invention is an automatic positioning harrow hitch for use with a two way plow, which is held in correct position during plowing in one direction, and is released for movement to the other position for plowing in the opposite or reverse direction. The invention includes means for automatically releasing the hitch and moving it to a new position when the plow is changed to accommodate a reverse direction of plowing.

These and other objects and advantages will be apparent by referring to the following description and appended drawings in which.

Figure 1:
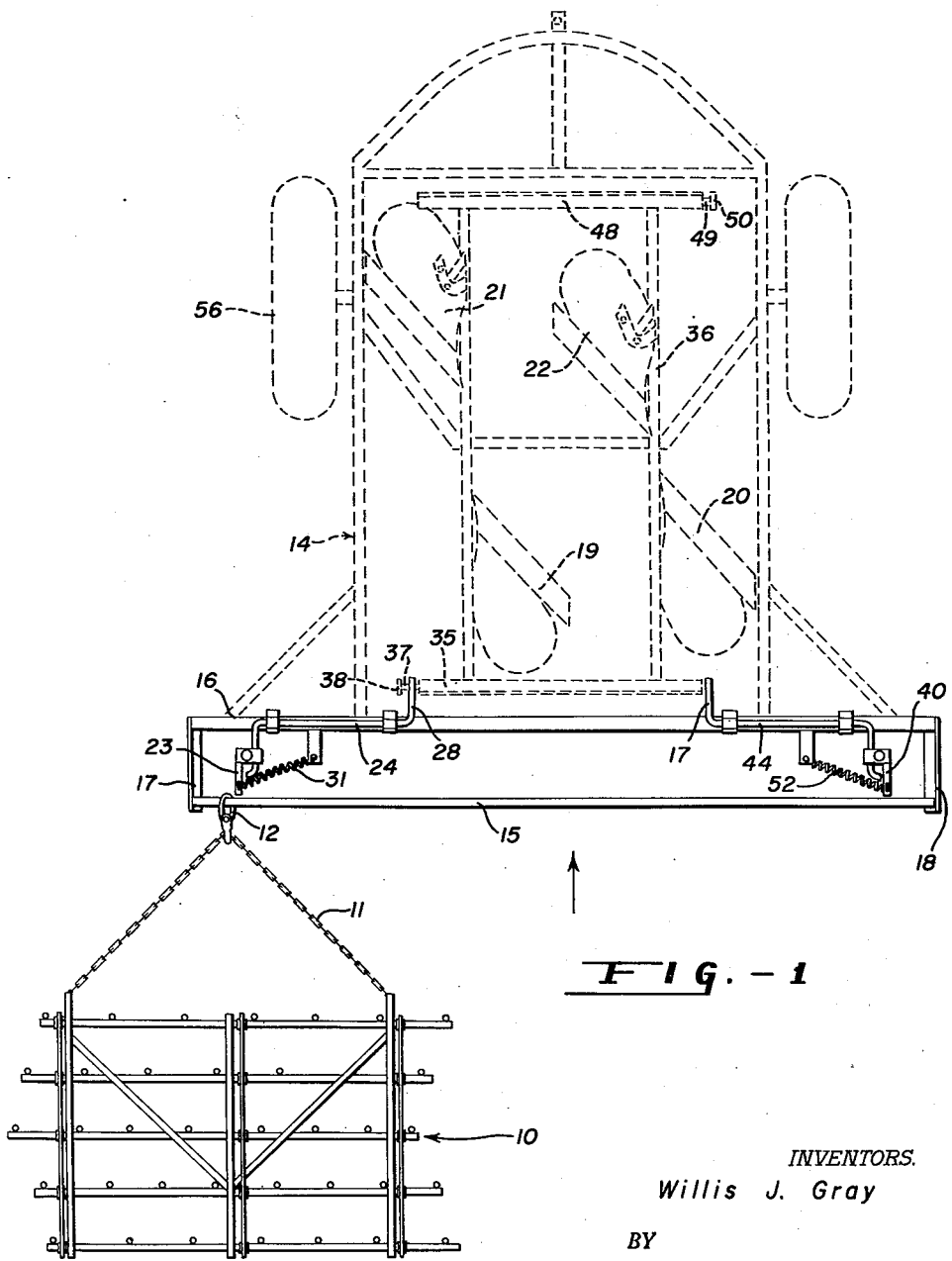
Fig. 1 is a plan view of a harrow interconnected with a tumble plow illustrating one position of the harrow in relation to the plow.

Referring now to Fig. 1, a harrow 10 having a chain yoke 11 connected to a hitch ring 12 is secured to a throw plow 14. The harrow hitch ring 12 encircles a slide bar 15 which is attached to hitch frame 16. The ends 17 and 18 of the frame prevent the disengaging of the ring from the bar. The harrow 10 is adapted to be pulled from either end 17 or end 18 of the slide bar during the plowing operation. When the plow is moving in the direction of the arrow of Fig. 1, plows 19 and 20 are in the ground and throwing a furrow to the left, and the harrow 10 is positioned at end 17 so as to ride on the plowed land.

On reversing the direction of the plow, plows 19 and 20 are raised and plows 21 and 22 are lowered in the ground, and the harrow placed in position at end 18 so that it will ride on the plowed ground on reverse plowing of the row.

Figure 2:
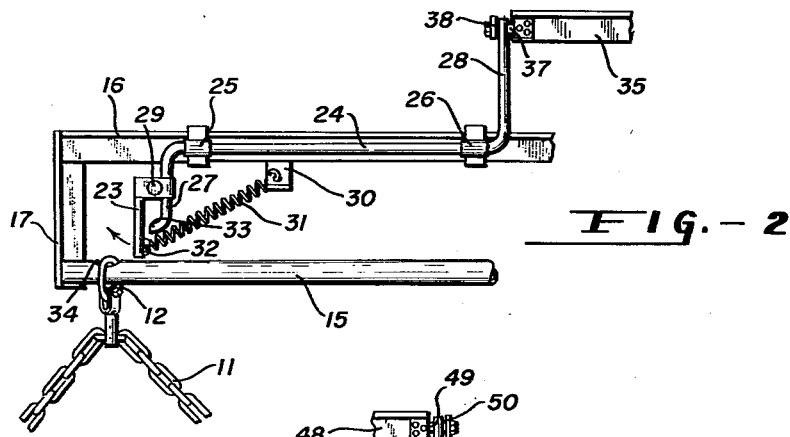
Fig. 2 is an enlarged detail of the hitch ring holding assembly according to the invention.

The automatic positioning equipment is illustrated in detail in Fig. 2, where the slide bar 15 is partially shown mounted on the frame 16. A trigger or latch 23 is mounted on a trigger arm 24 at end 17 of the harrow hitch. The trigger arm 24 is rotatably mounted in sleeves 25 and 26 which are secured as by bolting or otherwise to frame 16. The trigger arm includes a trigger support 27 and a trigger switch extension 28. The trigger 23 is pivotally mounted on the trigger support arm 27 by means of pin 29 secured to a journal, not shown, secured to the support arm 27. A spring support arm 30 is secured to the frame 16 and extends upwardly above the frame. A tension spring 31 is secured to the spring support 30 and to an eye 32 on trigger 23. The pivotal trigger 23 swings outwardly, as indicated by the arrow, and the spring 31 urges the return of the same to its position against a stop 33. The spring 31 is a double service spring, in that it urges the trigger 23 back to its position against the stop, and it also urges the trigger and trigger arm support back to its position after being tripped and rotated around trigger arm 24. The trigger is a double movement trigger, in that it moves outwardly under the influence of the hitch ring from its normal position to permit the ring 12 to slide into the space on the bar between the trigger and the end of the bar, and the trigger, also, rotates upwardly away from the bar so that the ring may slide along the bar from its position on the end thereof. A notch 34 is provided in each end of the bar to partially hold the ring and relieve the trigger of some of the force of the bearing of the ring on the bar.

A trigger switch or activating lug 37 mounted on the cross member 35 of frame 36 of the tumble plow is adapted to rotate arm 28 upwardly and hold the trigger 23 in position adjacent the bar 15. When the plow is tumbled the switch 37 trips the trigger extension 28, whereby to rotate the trigger assembly downwardly and release the ring from the end 17. As the switch 37 passes the extension 28, the trigger 23 returns to normal up or open position. The activating lug 37 may include a rowel which rotates as the trigger switch contacts and passes the extension or trigger 28, and a washer 38 guides the extension to prevent it from slipping off the trigger switch. The bushing assembly 37 is adjustable laterally in relation to the trigger switch 35 to provide optimum contact of the switch with the trigger arm.

Figure 3:
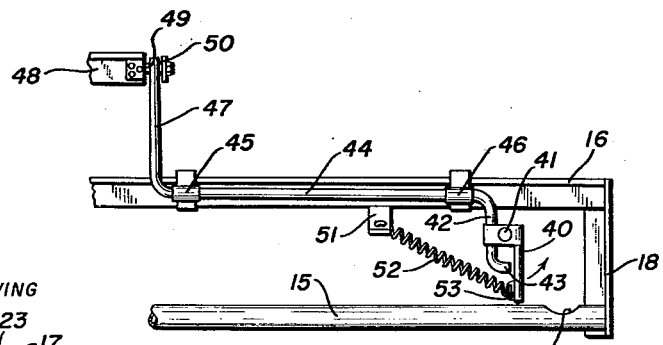
Fig. 3 is an enlarged detail of the opposite end of the harrow hitch holding assembly of Fig. 2, in position to accommodate a hitch ring.

The opposite end of the hitch assembly 18, Fig. 3, has a similar trigger arrangement, which includes a trigger 40 pivoted by means of a pin 41 to a trigger support arm 42. The trigger support arm has a stop 43 to prevent inward movement of the trigger. The trigger support arm is mounted on trigger arm 44 which is rotatably mounted in sleeves 45 and 46. A trigger extension arm 47 is adapted to engage a trigger switch or activating lug 49, which may include a bushing and a guide washer 50. A spring support 51 is mounted on the frame 16 to support one end of a spring 52. The other end of the spring is secured to an eye 53 mounted on the trigger 40.

Figure 4:
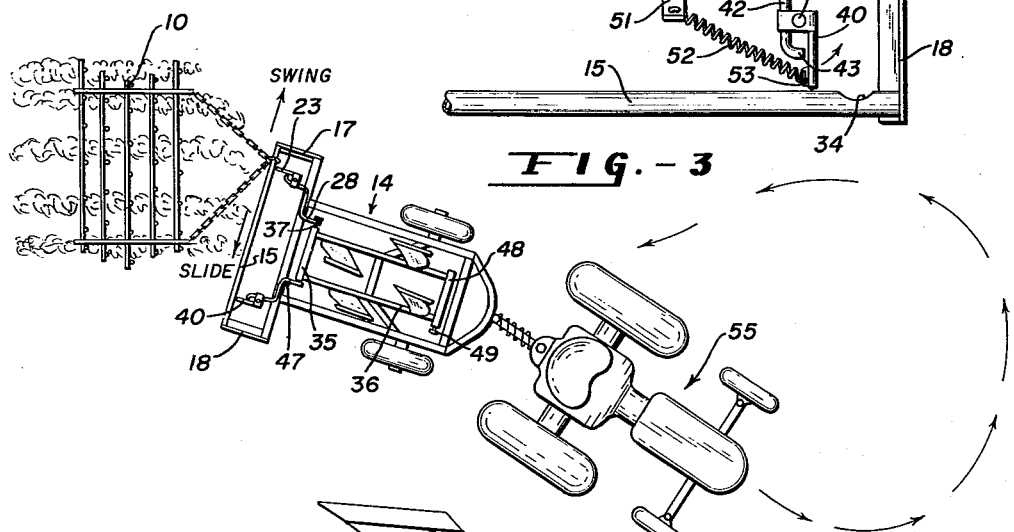
Fig. 4 is a top plan view showing an assembly of a tractor, a plow, and a harrow according to the invention, and the relation of the three units in a maneuver to reverse the direction of plowing.
Figure 5:
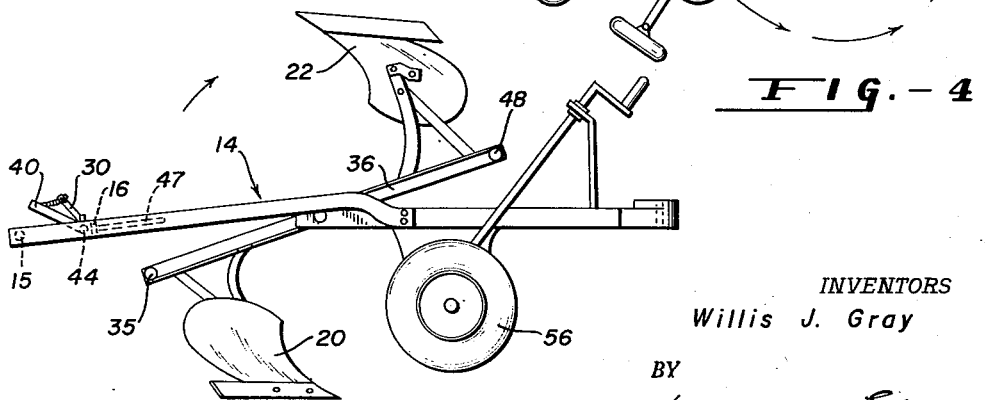
Fig. 5 is a side elevation of a tumble plow illustrating a trigger assembly according to the invention.

The triggers are tripped as the plow is tumbled or rolled over or lifted, as the case may be. As illustrated in Fig. 4, at the end of the plow row, a tractor 55 which is pulling a plow 14 and a harrow 10 is turned around as indicated in a left-hand turn. At the end of the row the operator starts the turn by turning right, lifts the plow from the ground, and then pulls the lever or rope which causes the plows to tumble or throw 180°. The plows are first lifted out of the ground by a mechanism which raises the whole plow frame up in relation to support wheels 56, after which the plows are rotated in a clockwise direction. As the plows rotate, trigger switch 35 contacts extension arm 28 releasing the trigger 23 and permitting the ring to slide to end 18. As the plow moves behind the turning tractor 55, the swing of the back part of the plow is away from the turn. The rear end of the plow swings to the left due to the initial right turn that the tractor makes prior to the left turn. The swing of the rear part of the plow causes the ring to slide along the bar into contact with the opposite trigger. The ring passes through the trigger and is held at that end during the completion of the turn and the return plowing. As the tractor completes its turn and starts back down the row, the plow shares 21 and 22 are in position to engage the ground and the switch release bar 48 is in position to trip trigger 40 at the opposite end of the row. It is thus apparent that the position of the harrow is changed with respect to the plow as the shares of the plow are changed during the reverse turn of the unit.

A similar mechanism may be utilized with lift plows, where each set of plows have a trigger, and as that set is lifted it releases its corresponding trigger to permit the harrow hitch to slide across the slide bar.

While the invention has been described by reference to a specific embodiment, there is no intent to limit the invention to the precise details so described, except insofar as set forth in the following claims.

I claim:

1. An automatic harrow positioner for a two-way plow, comprising a stationary bar hitch secured to said two-way plow, a harrow ring hitch slidably mounted on said bar hitch, latch means inclusive of a releasable trigger arm mounted on each end of said bar hitch for positioning and holding said hitch ring at either end of said bar hitch, release means for moving said latch means in and out of hitch ring holding position, and means on said plow for tripping said release means when the plow shares are changed for reverse plowing to release said ring from said held position.

2. An automatic harrow positioner for a two-way plow, comprising a substantially horizontal stationary bar hitch secured to said two-way plow, a harrow ring hitch slidably mounted on said bar hitch, latch means inclusive of a releasable trigger arm mounted on each end of said bar hitch for positioning and holding said hitch ring at either end of said bar hitch, release means for moving said latch means in and out of hitch ring holding position, and means on said plow for tripping said release means when the plow shares are changed to accommodate reverse plowing to release said hitching ring from said held position.

3. An automatic harrow positioner for a two-way plow, comprising a substantially horizontal stationary bar hitch secured to said two-way plow, a harrow ring hitch slidably mounted on said bar hitch, spring latch means for positioning and holding said hitch ring at either end of said bar hitch, said latch adapted for opening under influence of a sliding ring thereagainst for holding the same against reverse sliding, release means for moving said latch means in and out of hitch ring holding position, and means on said plow for tripping said release means when the plow shares are changed to accommodate the reverse direction of plowing to release said hitching ring from said held position.

4. An automatic harrow positioner for a tumble plow, comprising a substantially horizontal stationary bar hitch secured to said tumble plow, a harrow ring hitch slidably mounted on said bar hitch, spring latch means for positioning and holding said hitch ring at either end of said bar hitch, said latch means being movable outwardly to accommodate a ring sliding toward said end and prevent inward sliding of said ring, release means for rotating said latch means in and out of hitch ring holding position adjacent said bar, and means on said plow for tripping said release means when said plow is tumbled to accommodate a change of direction to release said hitching ring from said held position.

5. An automatic harrow positioner for a two-way plow, comprising a stationary slide bar secured to said two-way plow, a harrow ring hitch slidably mounted on said slide bar, a spring-loaded latch adjacent each end of said bar opening outwardly for admitting said hitch into held position, a latch support adapted for moving each latch in and out of hitch holding position with said bar, trigger means interconnected with said latch support whereby said latch may be rotated in and out of latch holding position, and means on said plow for tripping said trigger when said plow is changed from a one direction plow to the opposite direction plow to release said hitch ring from its held position.

6. An automatic harrow positioner for a two-way plow, comprising a substantially horizontal stationary slide bar secured to said two-way plow, a harrow ring hitch slidably mounted on said slide bar, a spring-loaded latch on each end of said bar opening outwardly for admitting said hitch into held position, a latch support adapted for moving said latch in and out of hitch holding position with said bar, a trigger interconnected with said latch support whereby said latch may be rotated in and out of latch holding position, and means on said plow for tripping said trigger when said plow is changed from a one direction plow to the opposite direction plow to release said hitch ring from its held position.

7. An automatic harrow positioner for a two-way plow, comprising a substantially horizontal stationary slide bar secured to said two-way plow, a harrow ring hitch slidably mounted on said slide bar, a spring-loaded latch on each end of said bar opening outwardly for admitting said hitch into held position, a latch support for moving each with said latch in and out of hitch holding position with said bar, the spring of said latch being adapted for urging said latch into holding position, a trigger interconnected with each said latch support whereby each said latch may be separately rotated in and out of latch holding position, and tripping means on said plow for tripping the trigger interconnected with the latch holding the ring when said plow is changed from a one direction plow to the opposite direction plow to release said hitch ring from its held position.

References Cited in the file of this patent

UNITED STATES PATENTS

| | | |
|---|---|---|
| 1,213,912 | Sergeant | Jan. 30, 1917 |
| 1,646,486 | Lytle | Oct. 25, 1927 |